Oct. 9, 1956   W. H. GRUEL   2,765,773
POULTRY NEST WITH REMOVABLE NEST BOTTOM INSERT
Filed Feb. 24, 1955   2 Sheets-Sheet 1

*INVENTOR:*
WILLIAM H. GRUEL
BY
Marjall, Johnston, Cook & Root
ATT'YS

Oct. 9, 1956 W. H. GRUEL 2,765,773
POULTRY NEST WITH REMOVABLE NEST BOTTOM INSERT
Filed Feb. 24, 1955 2 Sheets-Sheet 2
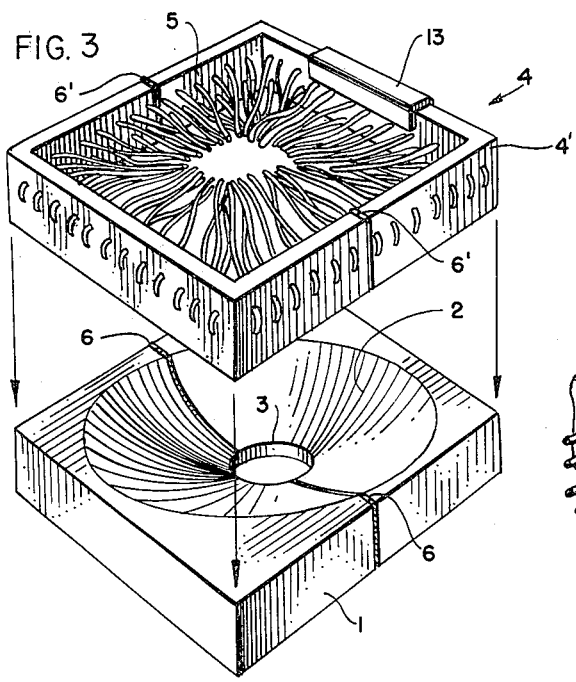
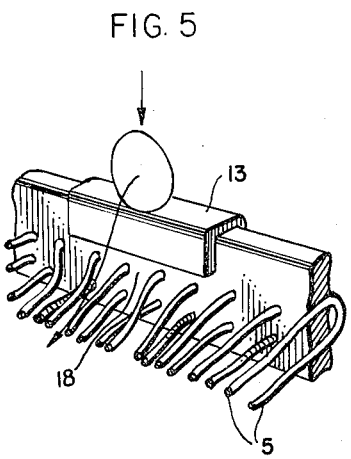
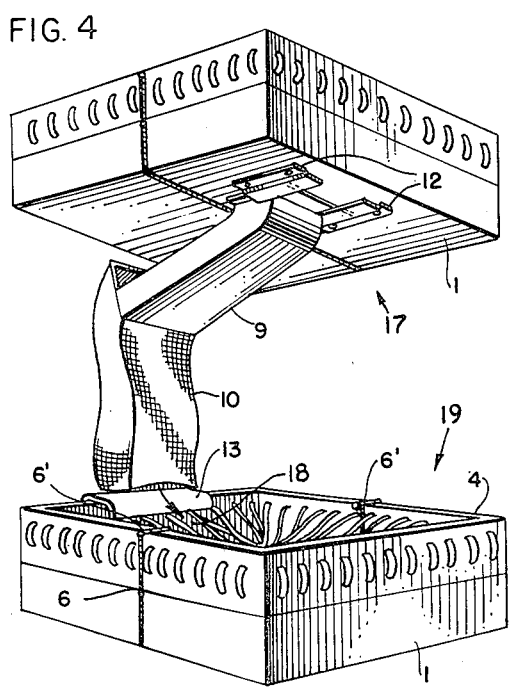
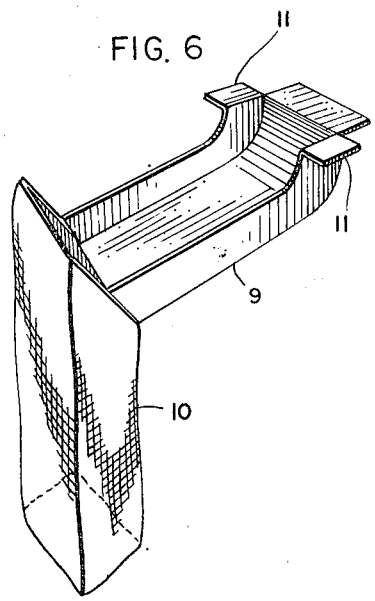
INVENTOR:
WILLIAM H. GRUEL
BY
Marzall, Johnston, Cook & Root.
ATT'YS

United States Patent Office 2,765,773
Patented Oct. 9, 1956

2,765,773

POULTRY NEST WITH REMOVABLE NEST BOTTOM INSERT

William H. Gruel, Crown Point, Ind.

Application February 24, 1955, Serial No. 490,376

3 Claims. (Cl. 119—48)

This invention relates to improved poultry nest structures and more particularly to such structures having means for the removal of freshly laid eggs from the nests.

In poultry farming, it has been found desirable to employ nest structures having a generally concave shape with sides sloping towards a hole through which freshly laid eggs may drop and be removed from the nests. The eggs thus removed can not be molested by hens and will therefore remain clean and unbroken. Heretofore, banks of nests have been commercially available wherein the eggs roll to conveniently placed troughs near each tier of nests to await gathering by the person tending the nests.

It is an object of this invention to provide an improved poultry nest which may be inserted into a bank of nest compartments now commercially available.

A further object is to provide a nest in hinged or collapsible sections, thereby permitting easy insertion into and removal from a nest compartment having a simple opening for the entrance of a hen.

Another object is to provide for the removal of freshly laid eggs from any nest in the bank by means which will conduct the eggs from any particular nest to another nest at a lower level where they may then be passed to further nests, ultimately ariving at a nest located in the bottom tier of the nest compartments where they may be passed to a suitable place or receptacle from which they can be conveniently gathered.

According to this invention, the nest structure is composed of two members, a lower member having a concave or bowl shaped surface sloping downwardly toward the center thereof with an opening at its lowest point and the upper member having a peripheral framework to which are attached many fibrous strands of material such as Manila hemp or leather. These strands extend inwardly and simulate fresh straw, which is attractive to a hen. The top member is adapted to rest on the lower member to provide a completed nest. Both members include a plurality of hinged frame sections adapted to be folded and permit their insertion into and removal from a nest compartment.

An egg chute is provided for attachment to the lower member in a position beneath the opening to receive an egg therefrom and to pass it downwardly to a side of a second nest positioned below the first nest.

Other objects and advantages of the invention will become apparent upon reading the following description taken in conjunction with the accompanying drawings in which:

Fig. 3 is an enlarged exploded perspective view more clearly illustrating the construction comprising the nest and the manner in which the top member will rest on a bottom member;

Fig. 4 is an enlarged perspective view illustrating the manner in which nests are positioned in tiers one above the other, and provided with a chute for conducting an egg from an upper nest to a position at the side of a nest at a lower level;

Fig. 5 is a fragmentary perspective view illustrating a detail of the nest section wherein a side is padded to cushion the fall of an egg passed down the chute from a nest above; and Fig. 6 is a perspective view illustrating the detailed construction of the egg chute showing a trough portion and a vertical fabric portion.

Figure 1:
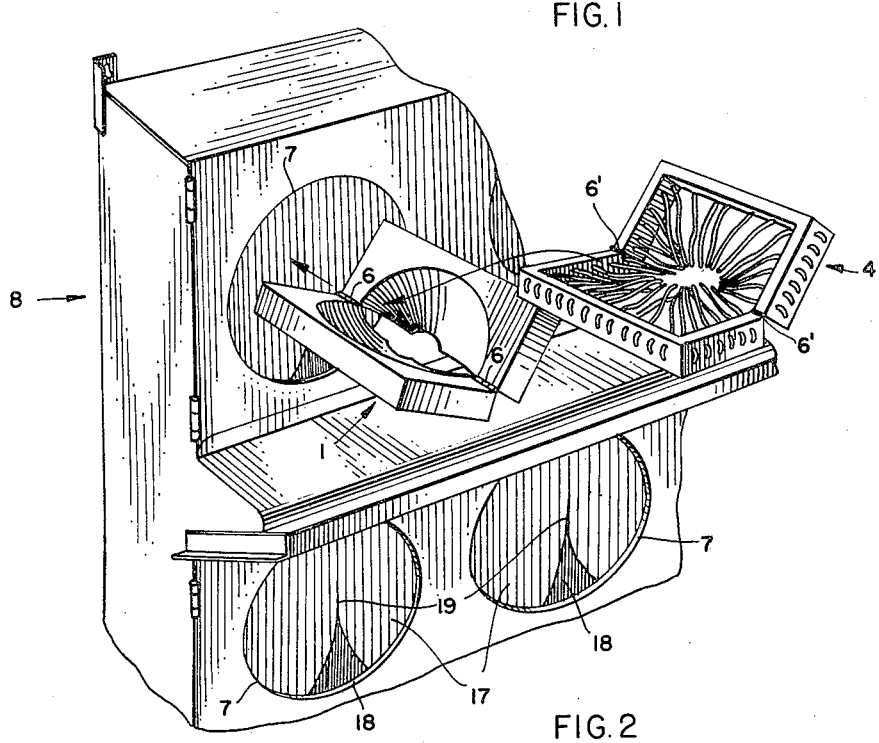
Fig. 1 is a perspective view of a portion of a bank of nest compartments illustrating the manner in which the nest structure of this invention may be inserted therein.

The nest illustrated in the drawings comprises a lower member 1 having a concave bowl shaped surface 2 sloping toward an opening 3, centrally located therein. An upper member 4 comprises a peripheral framework 4' to which fibrous strands stands 5 of material, such as Manila hemp or leather, may be fastened. The strands are disposed inwardly to lie upon the concave surface 2 of the lower member, assimilating straw or similar material attractive to hens. Although the strands may partially close over the opening 3 of the lower member, no restraint will be offered to an egg which may be laid in the nest and thence rolled to the center of the nest and fall through the opening.

Both the upper and the lower members 1 and 4 have hinges 6 and 6' permitting the resulting frame sections to fold as illustrated in Fig. 1. When folded they may be easily inserted through a nest opening 7 and placed in a desired compartment of the tiered structure 8.

An egg chute comprises an inclined metal trough portion or section 9 to which is attached a vertical fabric section 10. The trough section 9 is provided with flanges 11, and the lower nest structure 1 is provided with attachments 12 adapted to slidably receive the flanges 11 of the trough section 9. The trough section 9 may thereby be supported from the lower nest section 1 and will assume a position directly beneath the opening 3 of the nest member 1 to receive an egg therefrom. The fabric section 10 is attached to the metal trough 9 and will hang vertically therefrom with its lower extremity positioned above a side of the nest at a lower level. Thus, as shown in Fig. 4, the chute 9, 10 will conduct an egg from an upper nest 17 to a side 18 of a lower nest 19.

The upper nest members 4 are provided with a pad 13 which is positioned directly below the vertical fabric portion of the egg chute from the nest above. An egg sliding down the egg chute will thereby be cushioned upon arriving at the side 18 of the nest therebelow. As illustrated in Fig. 5, an egg will topple from the padded peripheral frame 13 into the nest portion which is concave in shape, and be further conducted from that nest through the opening 3.

It has been found that the presence of a hen in a nest into which an egg is rolled will not interfere with the normal routing of that egg. The hen will instinctively rise and with her feet atttempt to place the egg beneath her and in so doing will cause it to be ejected from the central opening of the nest.

Figure 2:
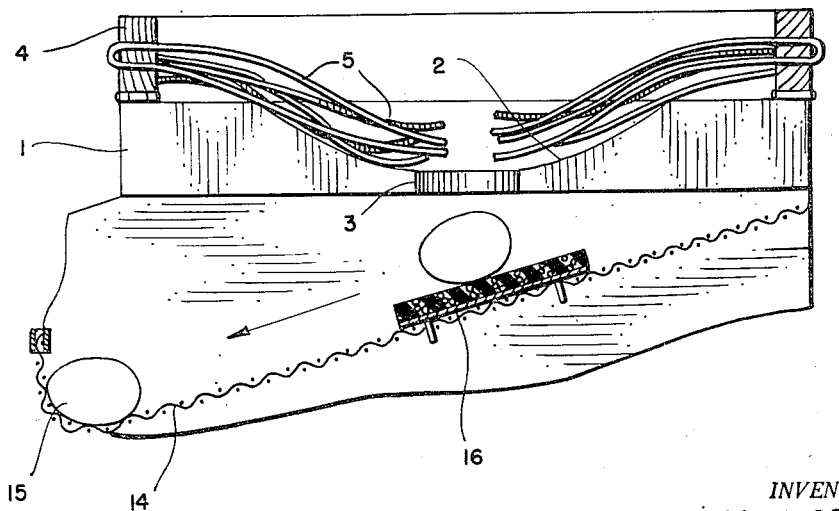
Fig. 2 is an enlarged elevational view, partly in section, showing the manner in which an egg may drop through the center opening and be received in a suitable place beneath the lowest tier of nests to await gathering by a person tending the nests.

As illustrated in Fig. 2, the eggs will finally come to rest in a place or container beneath the lower tier of nests and may be conveniently gathered therefrom. A wire mesh 14 may form a trough with one side sloping to receive eggs from the opening 3 and to cause the eggs to roll forward to a gathering place illustrated by the position of an egg 15. A pad 16 is fastened on the wire mesh 14 to cushion the fall of the eggs as they drop through the opening 3.

To make the nest compartments more attractive to hens, a curtain 17 may be hung to partially close the round opening 7 and to darken the interior of the compartment. Such a curtain may have an inverted V-shaped opening 18 with the vertex of the V terminating in a slit 19 which will permit enlargement of the opening 18 to accommodate the hen. These curtains 17 may be hung either within the nest compartments as illustrated in Fig. 2 or may be hung across the openings 7 from a rod or other means (not shown).

The poultry nests of this invention enjoys the advantages of being simple to manufacture and easy to install into nest compartment structures presently available. The owners of poultry farms may install these nests into the present structures with a minimum of effort and expense.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A poultry nest unit adapted to be placed in a nest compartment comprising, a lower member and an upper member disposed immediately above the lower member, each of said members constituting a plurality of hinged frame sections, whereby they may be folded to reduce the side dimensions thereof for insertion into a nest compartment, said lower member having a concave surface sloping downwardly toward the center thereof, said concave surface having an opening adapted to pass an egg therethrough, and said upper member having a plurality of fibrous strands fixed to the frame thereof and disposed generally inwardly therefrom.

2. A poultry nest unit adapted to be placed in a nest compartment comprising, a lower member and an upper member disposed immediately above the lower member, each of said members constituting a plurality of hinged frame sections, whereby they may be folded to reduce the side dimension thereof for insertion into a nest compartment, said lower member having a concave surface sloping downwardly toward the center thereof, said concave surface having an opening adapted to pass an egg therethrough, said upper member having a plurality of fibrous starnds fixed to the frame thereof and disposed generally inwardly therefrom, and means positioned below the opening through said lower member for conveying an egg away therefrom.

3. The combination of elements defined in claim 2, wherein said last named means constitutes a chute secured to the underside of said lower member.

References Cited in the file of this patent

UNITED STATES PATENTS

| | | |
|---|---|---|
| 404,073 | Butterick | May 28, 1889 |
| 1,106,517 | Mathews | Aug. 11, 1914 |
| 1,329,963 | Faust | Feb. 3, 1920 |
| 1,452,141 | Baxter | Apr. 17, 1923 |
| 1,914,160 | Pine | June 13, 1933 |
| 1,925,456 | Muehr | Sept. 5, 1933 |
| 2,262,795 | Carlstrom | Nov. 18, 1941 |
| 2,708,420 | Drefke | May 17, 1955 |